United States Patent
McVittie

(10) Patent No.: US 9,560,328 B1
(45) Date of Patent: Jan. 31, 2017

(54) SCANNED BEAM PROJECTOR PULSED LASER CONTROL

(71) Applicant: Microvision, Inc., Redmond, WA (US)

(72) Inventor: Patrick J. McVittie, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 14/876,578

(22) Filed: Oct. 6, 2015

(51) Int. Cl.
H04N 9/31 (2006.01)

(52) U.S. Cl.
CPC .......... *H04N 9/3185* (2013.01); *H04N 9/3135* (2013.01)

(58) Field of Classification Search
CPC ............ G09G 2310/027; H04N 9/3161; H04N 9/3129; H04N 9/3123
See application file for complete search history.

(56) References Cited

U.S. PATENT DOCUMENTS

| | | |
|---|---|---|
| 2003/0219049 A1 | 11/2003 | Suda |
| 2005/0018722 A1 | 1/2005 | Check |
| 2007/0086495 A1 | 4/2007 | Sprague et al. |
| 2008/0112028 A1* | 5/2008 | Peterson .............. G02B 26/105 359/204.1 |
| 2009/0161707 A1* | 6/2009 | Champion ............ H01S 5/0683 372/29.011 |
| 2009/0274185 A1 | 11/2009 | Champion |
| 2010/0061413 A1 | 3/2010 | Nishioka et al. |
| 2010/0149073 A1* | 6/2010 | Chaum .............. G02B 27/0093 345/8 |
| 2010/0156863 A1* | 6/2010 | Brown ................. H04N 9/3194 345/207 |

OTHER PUBLICATIONS

Microvision, Inc. "PCT International Search Report and Written Opinion", Nov. 2, 2016.

* cited by examiner

*Primary Examiner* — Michael Teitelbaum
(74) *Attorney, Agent, or Firm* — Kevin D. Wills

(57) ABSTRACT

Briefly, in accordance with one or more embodiments, a scanned beam projector comprises a laser diode to emit a beam, a scanning engine to scan the beam on a surface to project an image comprising virtual pixels on the surface, a digital-to-analog converter (DAC) coupled to the laser diode to cause the laser diode to emit the beam in response to a digital video signal provided to the DAC, and a pulsed pixel controller to provide the digital video signal to the DAC, the pulsed pixel controller to align the digital video signal provided to the DAC with the virtual pixels of the image, and to select an optimal waveform to be generated by the laser diode for each virtual pixel.

18 Claims, 11 Drawing Sheets

SCANNED BEAM PROJECTOR PULSED LASER CONTROL

BACKGROUND

Scanned beam video projectors ideally project a grid of evenly spaced virtual pixels onto a surface. Due to the geometry, optical path distortion, and changing scanner velocity, each virtual pixel is scanned across the surface in a continually changing time period. One challenge of digital scanned beam projection is matching this continually changing time period to the fixed clock period of a digital control system. Another challenge of laser based scanned beam video projectors is that generating a continuous low light power from a laser is far less efficient than generating higher laser powers. It is much more efficient to generate low optical powers by modulating between off and a higher optical power. This modulation can reduce the maximum brightness of the video content.

In the past, scanning laser based video projectors have used constant sample frequency digital-to-analog converters (DACs) to generate laser drive waveforms. To resynchronize these waveforms with the continually changing virtual pixel frequency, digital upsampling and interpolation may be used. Upsampling involves a far higher DAC sample rate which has a high bus transaction power cost. Interpolation may cause a loss of image sharpness particularly for computer generated video content. Modulation of the laser optical power has been tried in two orthogonal ways both using a constant frequency DAC. The first method provides each non-zero DAC sample with the same waveform. This method shows a reduction in laser speckle artifacts and an increase in efficiency but drastically reduces the maximum brightness of the projector. The second method zeroes all but one DAC sample in each pixel period. This method shows an increase in laser efficiency but shows a reduction in brightness and significant video artifacts since the active sample is not locked to the position of each pixel.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 9:
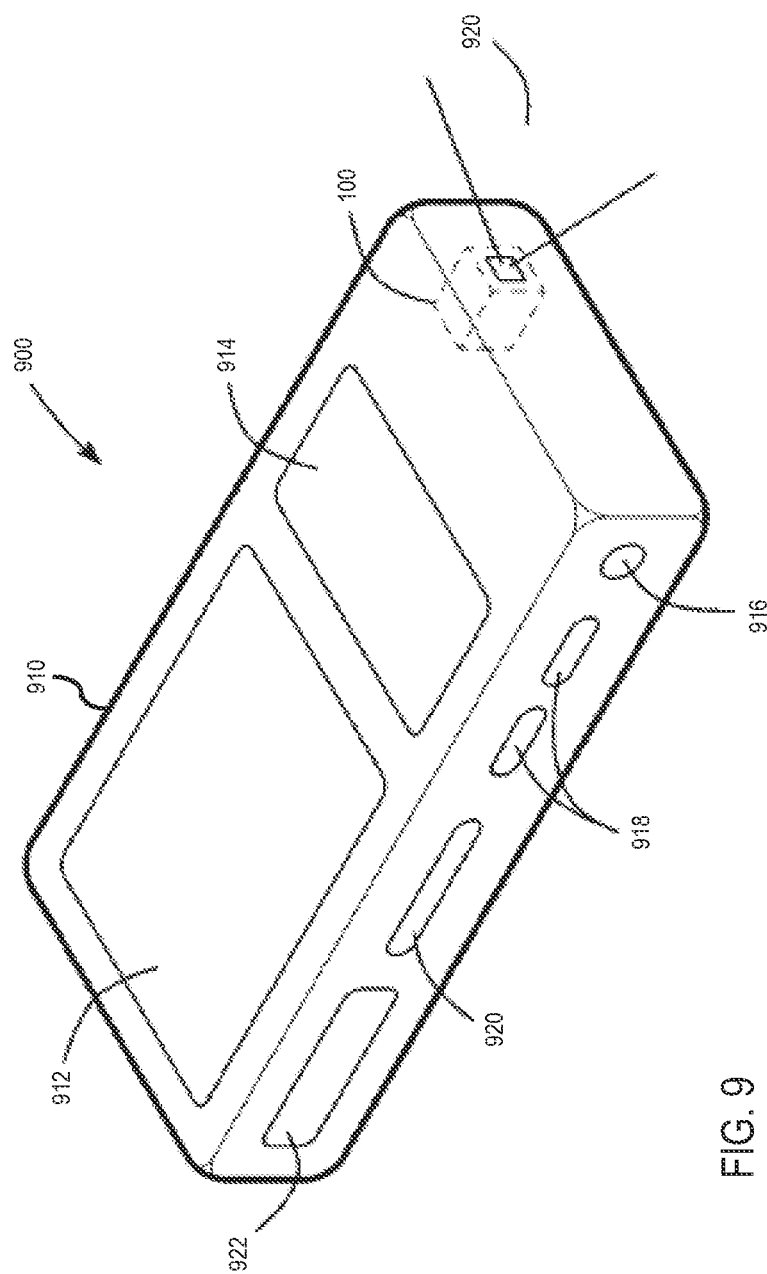
Figure 10:
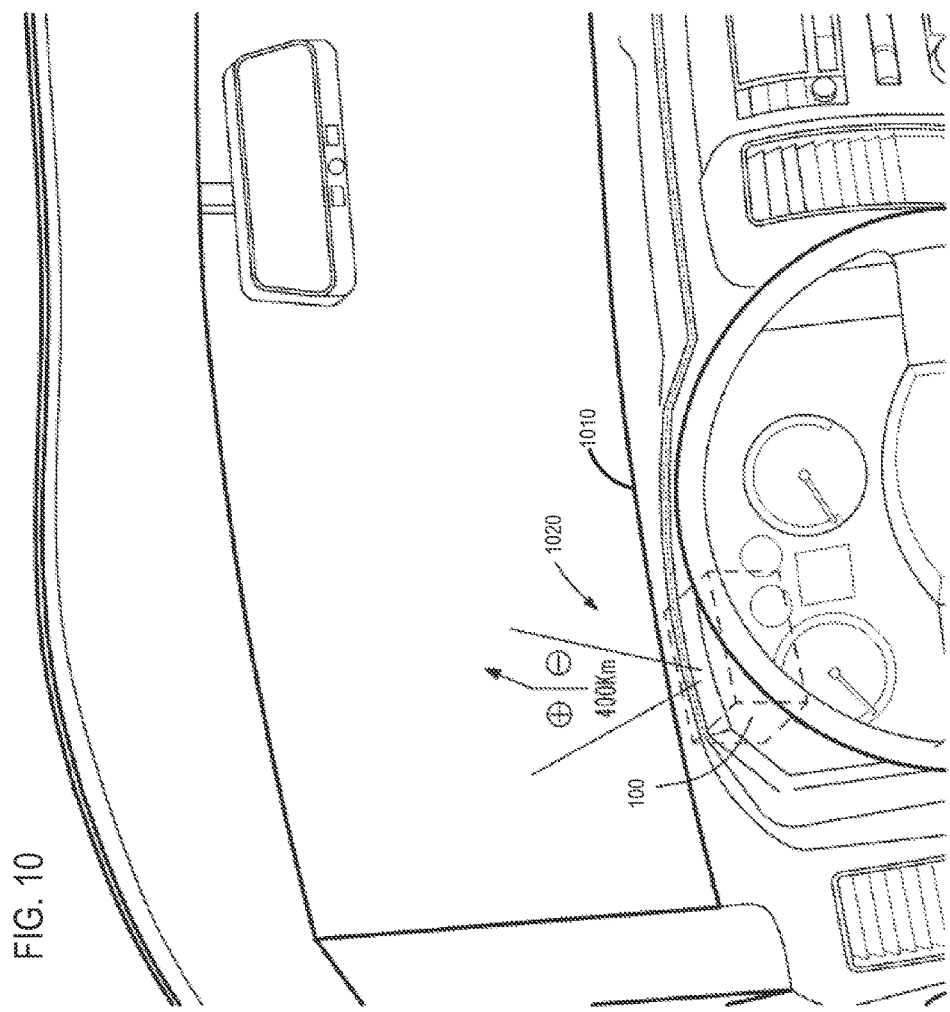
Figure 11:
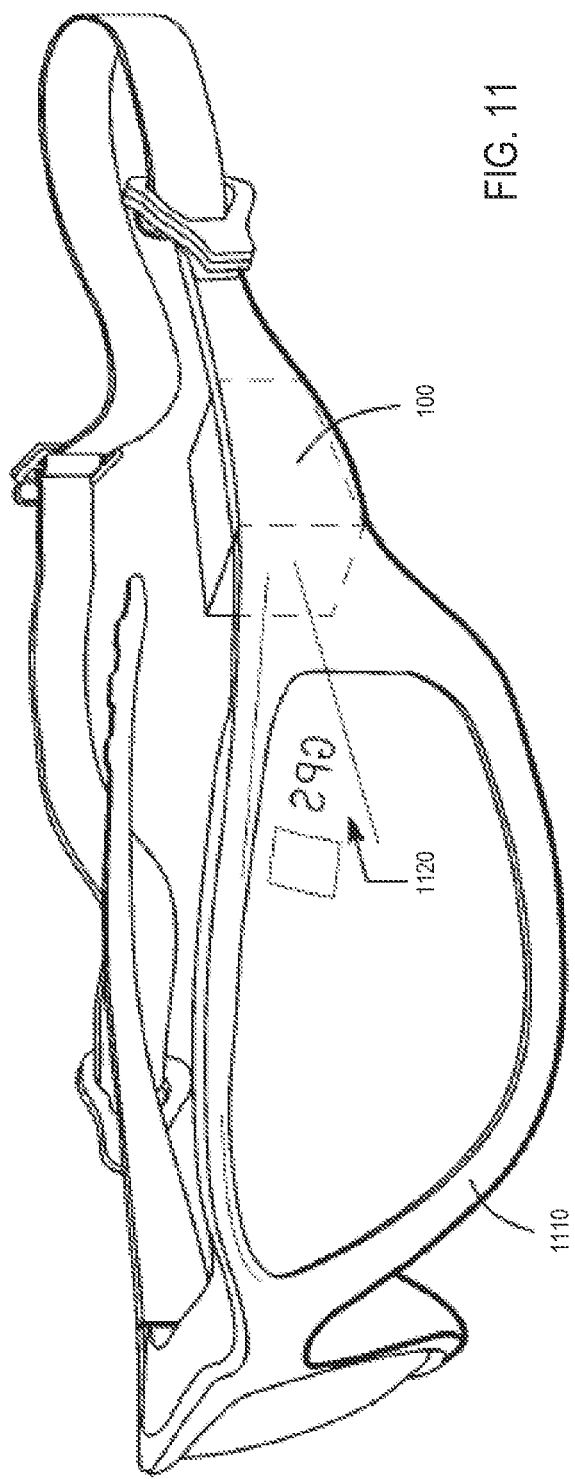

FIG. 9 is an isometric view of an information handling system that includes a scanned beam projector having controlled pulsed pixels in accordance with one or more embodiments; and FIG. 10 is a diagram of a vehicle that includes a scanned beam projector having controlled pulsed pixels deployed as a head-up display (HUD) in accordance with one or more embodiments; and FIG. 11 is a diagram of eyewear that includes a scanned beam projector having controlled pulsed pixels deployed as a head-mounted display (HMD) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
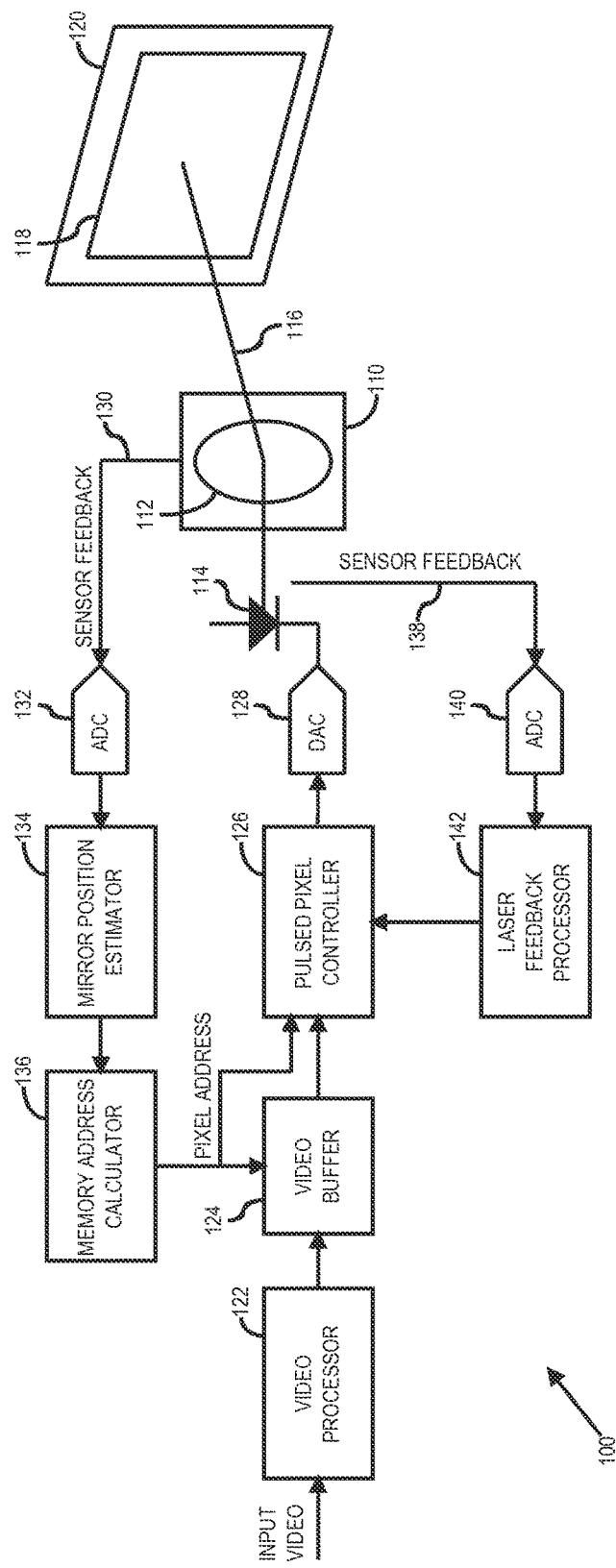
FIG. 1 is a block diagram of a laser beam scanner having a pulsed pixel controller in accordance with one or more embodiments.

Referring now to FIG. 1, a block diagram of a laser beam scanner having a pulsed pixel controller in accordance with one or more embodiments will be discussed. As shown in FIG. 1, a laser beam scanner 100 may comprise a scanning engine 110 comprising a microelectromechanical system (MEMS) mirror 112 that may be actuated to oscillate about a first axis in a first direction, and to oscillate about a second axis in a second direction. A laser diode 114 may emit a beam such as a laser beam 116 that is reflected off of scanning engine 110 wherein the MEMS mirror 112 scans the reflected beam 116 to generate an image 118 on surface 120. Although FIG. 1 illustrates one type of a scanned beam display system for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also utilize the claimed subject matter and the scope of the claimed subject matter is not limited in this respect.

In one or more particular embodiments, the laser beam scanner 100 as shown in FIG. 1 may comprise a pico-projector developed by Microvision Inc., of Redmond, Wash., USA, referred to as PicoP™. In such embodiments, laser diode 114 of such a pico-projector may comprise one red, one green, and one blue laser diode with a lens near the output of the respective lasers that collects the light from the laser and provides a very low numerical aperture (NA) beam at the output. The light from the lasers may then be combined with dichroic elements into a single white beam 116. Using a beam splitter and/or basic fold-mirror optics, the combined beam 116 may be relayed onto a biaxial MEMS scanning mirror 112 disposed on scanning engine 100 that scans the output beam 116 in a raster pattern on surface 120. Modulating the lasers synchronously with the position of the scanned output beam 116 may create the projected image 118. In one or more embodiments the laser beam scanner 100 may comprise a single module known as an Integrated Photonics Module (IPM) which in some embodiments may be 7 millimeters (mm) in height or less, and in some embodiments the IPM may be less than 5 mm in height. Furthermore, IPM 100 may be less than 5 cubic centimeters (cc) in total volume, although the scope of the claimed subject matter is not limited in these respects. In one or more embodiments, laser beam scanner may comprise a stand-alone device that is capable of generating an image 118 on a surface 120 in response to a receiving a display signal as an input. In one or more embodiments, laser beam scanner 100 may be integrated in or with, or otherwise coupled to, an information handling system as shown in and described with respect to FIG. 8, below.

In one or more embodiments, laser beam scanner 100 includes a pulsed pixel controller 126 to control the pulsing of the scanned beam 116 when the beam 116 is scanned along surface 120 in a raster pattern to generate image 118. The pulsed beam generates a waveform at intended pixel positions of image 118 wherein the intended pixel positions may be referred to as virtual pixels. The waveforms generated on surface 120 from the beam pulses comprise the actual physical pixels of image 118. Pulsed pixel controller 126 may be configured to generate the beam pulses so that the physical locations of the beam pulses correspond with the locations of the virtual pixels by aligning the beam pulses in time as the virtual pixels vary in location on surface 120. Furthermore, pulsed pixel controller 126 may be configured to maximize the power efficiency of the beam pulses per pixel by selecting a maximally efficient waveform for each pixel. Alignment of the beam pulses with the virtual pixels and waveform selection are discussed in greater detail, below.

In one or more embodiments, a video processor 122 receives input video data and provides the video data to a video buffer which in turn feeds the video data to pulsed pixel controller 126. Pulsed pixel controller provides a digital signal corresponding to the video data to a digital-to-analog converter (DAC) 128 which converts the digital signal to an analog signal to drive laser diode 114 to emit laser beam 116 in response to the analog signal. To facilitate determining the position of the beam pulses with respect to the virtual pixels, a sensor (not shown) may be disposed on scanning engine 110 to provide feedback regarding an instantaneous position of MEMS mirror 112, for example via a piezoelectric sensor disposed on a flexure arm of MEMS mirror 112 to produce an electrical signal proportional to the amount of deflection of the flexure arm which indicates an amount of rotation of MEMS mirror 112 about the flexure arm. The feedback signal may be provided to an analog-to-digital converter (ADC) 132 as sensor feedback 130 to provide the sensor feedback signal as a digital signal to mirror positon estimator 134. Mirror position estimator 134 estimates a position of MEMS mirror 112 and provides the estimated mirror positing to a memory address calculator 136. The memory address calculator 136 determines the pixel addresses of pixels of image 118 for corresponding beam pulses. The pixel addresses are fed to pulsed pixel controller 126 so that pulsed pixel controller 126 may determine an amount of adjustment in time, or delay, to provide to the beam pulses to align the beam pulses with the virtual pixels of image 118. In addition, another sensor (not shown) may determine an intensity of the beam 116 emitted by laser diode 114 to provide sensor feedback 138 to another analog-to-digital converter (ADC) 140 which in turn provides a digital signal to laser feedback processor 142. The laser feedback processor 142 determines the intensity of the pulsed beam waveform and provides this information to pulsed pixel controller 126 to allow pulsed pixel controller 126 to control the energy of the beam pulses generated by laser diode 114. As a result, pulsed pixel controller 126 is able to utilize sensor feedback 130 and sensor feedback 138 to facilitate alignment of the beam pulses with the virtual pixels of image 118, and to control the waveform of the beam pulses to maximize the off-time of the laser beam 116 while maintaining sufficient pixel energy. Further details of beam pulse alignment and waveform selection are shown in and described with respect to FIG. 2, below.

Figure 2:
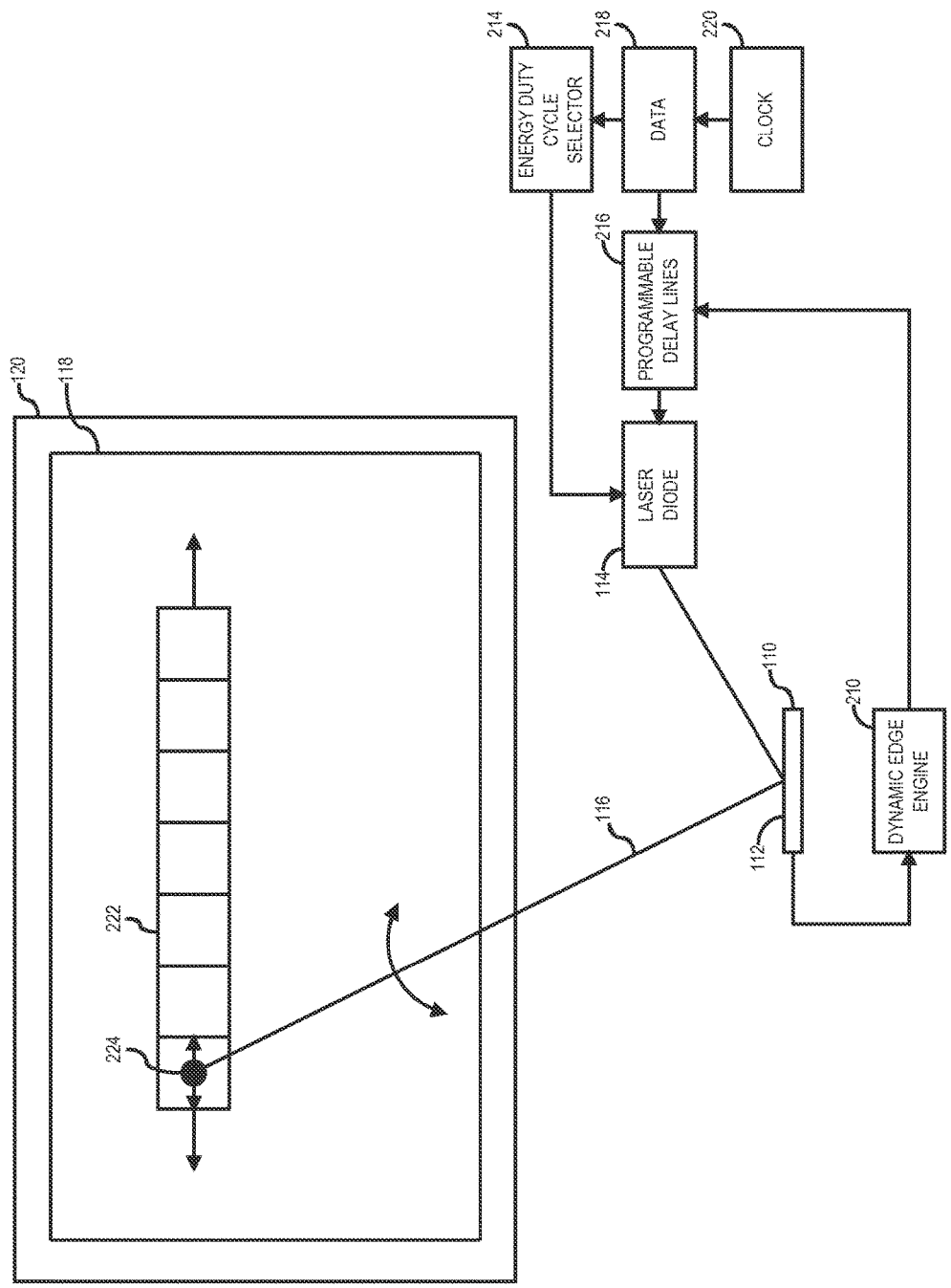
FIG. 2 is a block diagram of portions of the laser beam scanner of FIG. 1 illustrating alignment of a beam pulse with a virtual pixel and waveform selection of the beam pulse in accordance with one or more embodiments.

Referring now to FIG. 2, a block diagram of portions of the laser beam scanner of FIG. 1 illustrating alignment of a beam pulse with a virtual pixel and waveform selection of the beam pulse in accordance with one or more embodiments will be discussed. As shown in FIG. 2, scanned beam display 100 may include a dynamic edge engine (DEE) 210, an energy duty cycle selector (EDS) 214, and programmable delay lines 216, all of which may comprise functional blocks of pulsed pixel controller 126 of FIG. 1. It should be noted that the arrangement of laser beam display 100 of FIG. 2 is simplified for purposes of example, and furthermore the element shown are not necessarily depicted in proportion or scale. In the conceptual arrangement shown in FIG. 2, laser diode 114 emits a laser beam 116 that is reflected off of MEMS mirror 112 of scanning engine 110 to generate beam pulses 224, which comprise physical pixels, at desired locations comprising the virtual pixels 222 of image 118.

The dynamic edge engine 210 aligns the beam pulses 224 with the corresponding virtual pixels 222. As scanning engine 110 directs the laser beam 116 along its horizontal scan path, the dynamic edge engine 210 controls the timing of the beam pulses 224 with respect to the virtual pixels 222 by controlling a delay time of the beam pulses 224 with programmable delay lines 216. As the video data 218 is received at regular clock intervals as controlled by clock 220, the video data may be slightly delayed in time on a per clock basis for each pixel to align a given beam pulse 224 within a given corresponding virtual pixel 222. The amount of delay may be varied on a clock by clock basis so that alignment of each beam pulse 224 may be adjusted individually for each corresponding virtual pixel 222. In addition, energy duty cycle selector 214 may select a waveform for each individual beam pulse 224 to maximize, or nearly maximize the efficiency of the waveform for each virtual pixel 224. Further details on waveform selection for the beam pulses 224 is shown in and described with respect to FIG. 3 and FIG. 4, below.

Figure 3:
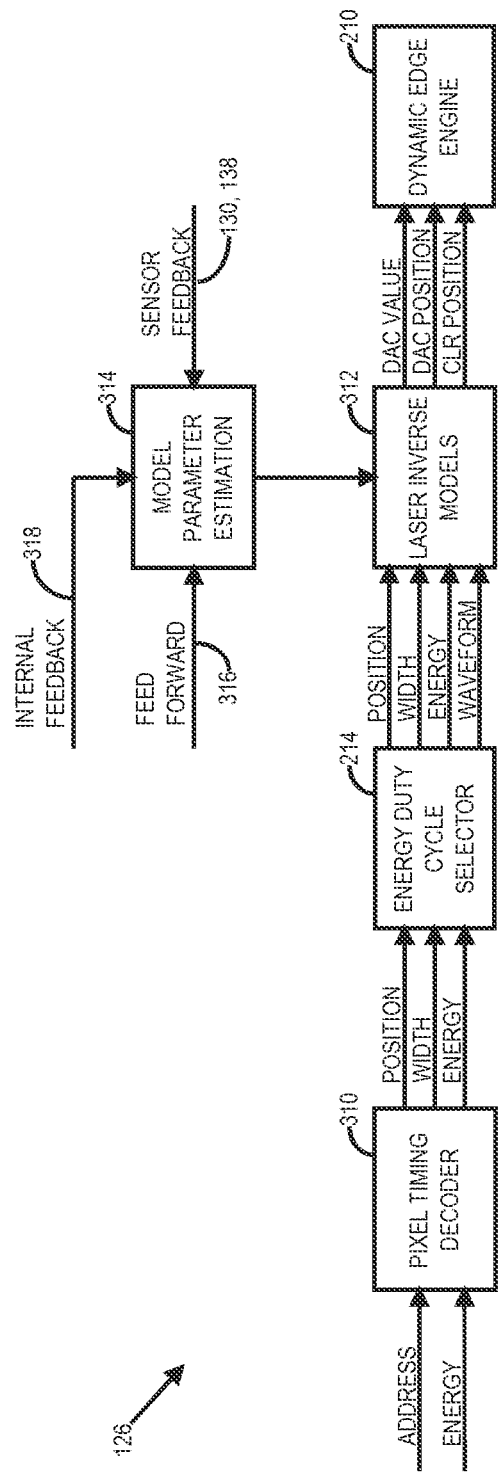
FIG. 3 is a diagram of the blocks of the pulsed pixel controller of FIG. 1 in accordance with one or more embodiments.

Referring now to FIG. 3, a diagram of the blocks of the pulsed pixel controller of FIG. 1 in accordance with one or more embodiments will be discussed. As shown in FIG. 3, pulsed pixel controller 126 may comprise a pixel timing decoder 310 that receives pixel address and energy signals, and outputs pixel position, width, and energy signals to energy duty cycle selector 214. The energy duty cycle selector 214 provides position, width, energy, and waveform signals to a laser inverse models block 312. The laser inverse models block receives a signal from a model parameter estimation block 314 which receives sensor feedback signals 130 and 138, and a feed forward signals 316 which include energy and waveform signals from energy duty cycle selector 214. In addition, model parameter estimation block 314 receives internal feedback 318 which is the DAC value from laser inverse models block 312. Internal feedback 318 may be utilized in conjunction with feed forward signals 316 to adjust the parameters of laser inversion models block 312 on a faster time scale than may be allowed with sensor feedback signals 130 and 138. The laser inverse models block 312 provides DAC value, DAC position, and clear position signals for DAC 128 to dynamic edge engine 210. Dynamic edge engine 210 provides alignment of the DAC samples as shown in and described with respect to FIG. 6, below. Energy duty cycle controller 214 provides selection of a waveform for the beam pulses as shown in and described with respect to FIG. 4 and FIG. 5, below.

Figure 4:
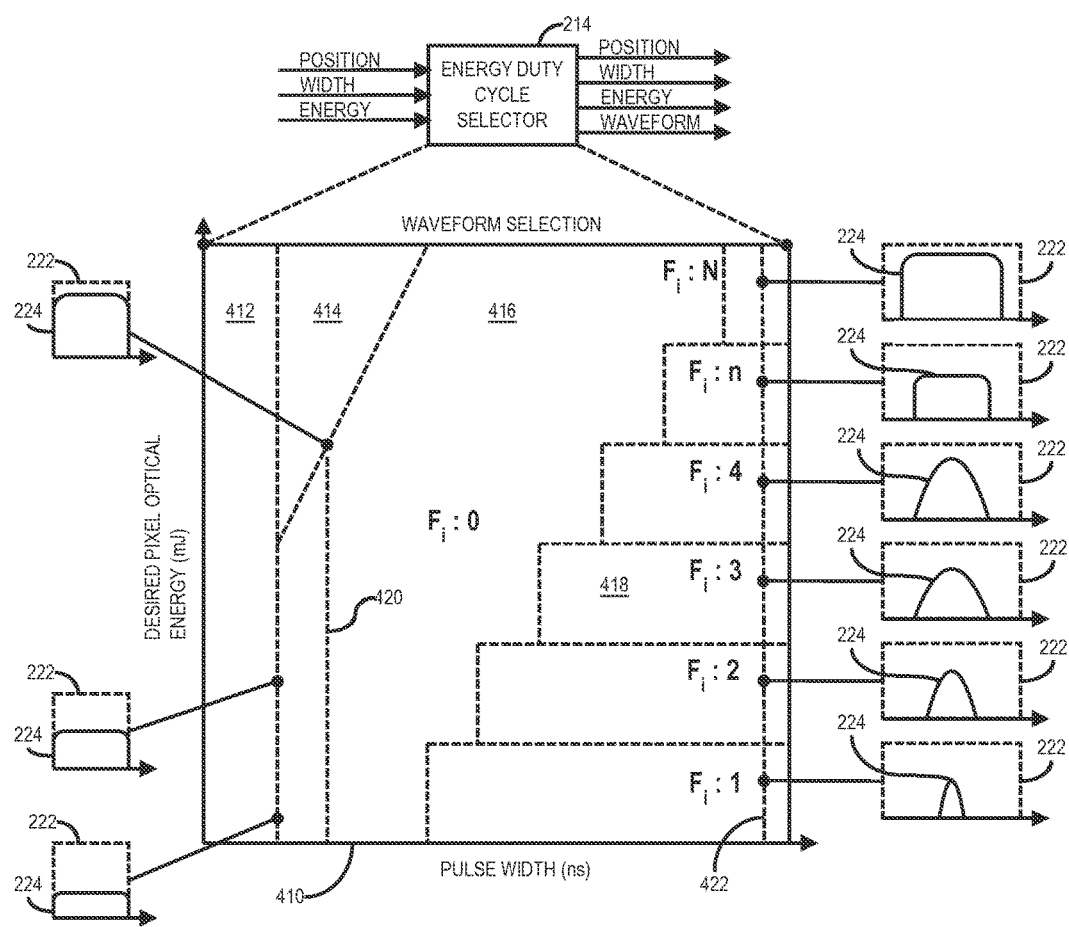
FIG. 4 is a diagram of waveform selection with an energy duty cycle selector illustrating dynamically aligned pulses having constant pixel widths but varying beam pulse widths in accordance with one or more embodiments.

Referring now to FIG. 4, a diagram of waveform selection with an energy duty cycle selector illustrating dynamically aligned pulses having constant pixel widths but varying beam pulse widths in accordance with one or more embodiments will be discussed. As shown in FIG. 4, energy duty cycle selector 214 provides waveform selection for beam pulses of laser beam 116 for corresponding virtual pixels 222. To maximize power efficacy, energy duty cycle selector 214 determines the maximally efficient achievable waveform for each pixel. The waveform may be determined based on the commanded optical energy and time period of the virtual pixel 222. The waveform is chosen which maximizes the off-time of the laser diode 114 and thus the laser beam 116 while maintaining sufficient pixel energy accuracy. Such a waveform selection process may result in an increase in overall efficiency of laser beam display 100 over a single scaled pulse waveform architecture. Furthermore, the waveform selection process allows scanned beam display 100 to maintain the same maximum brightness of an equivalent non-pulsed display by using a waveform that is a constant value over the entire pixel for the brightest pixels.

Graph 410 shows desired pixel optical energy in millijoules (mJ) versus pixel width in nanoseconds (ns). In region 412 the pixel widths are unachievable because the pixel widths are too narrow. In region 414 the optical energy is unachievable because the laser diode 114 cannot achieve those levels of pixel energy in the shorter periods of time in this region. In region 416 the optical energy is achievable but there is insufficient time to turn the pulse off within the pixel period and still maintain sufficient pixel energy. In region 418, the widths of the virtual pixels 222 are constant but the widths of the beam pulses 224 may vary. As shown in FIG. 4, vertical line 420 in region 416 represents pixel widths of a constant value. To increase the desired pixel optical energy in region 416, the amplitudes of the corresponding beam pulses 224 increase in amplitude with increasing pixel energy values while the widths of the beam pulses 224 remain constant. To increase the desired pixel optical energy in region 418 for example along vertical line 422, the widths of the beam pulses 224 increase in width with increasing pixel energy values while the amplitudes of the beam pulses 224 remain constant. Thus, energy duty cycle selector 214 selects a waveform for the beam pulses 224 from region 418 for the dynamically aligned beam pulses 224. As a result, in region 418 the dynamic alignment and waveform selection of beam pulses 224 allows a maximum amplitude to be selected that always exceeds the threshold value of operation ($I_{TH}$) of laser diode 114 is always exceeded and does not approach or fall below the threshold value which provides for greater efficiency of operation of laser diode 114. In addition, the beam pulses 224 are aligned within the center of the virtual pixels 222 which avoids blurring of the pixels that may otherwise occur if the beam pulses 224 were at the edges of the virtual pixels 222. In addition, maximum brightness of each pixel may be achieved when the beam pulses 224 are aligned with the centers of the virtual pixels 222.

Figure 5:
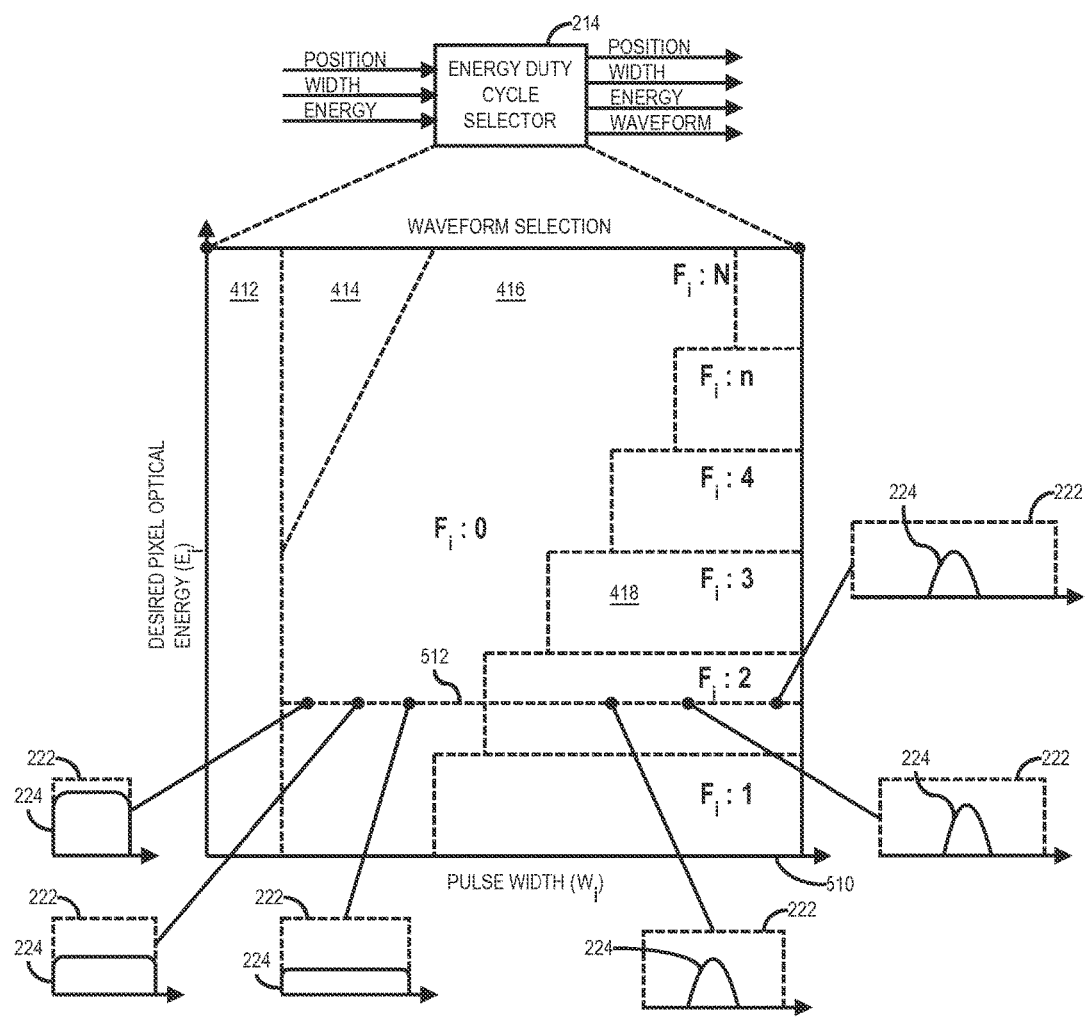
FIG. 5 is a diagram of waveform selection with an energy duty cycle selector illustrating dynamically aligned pulses having a constant energy pulse widths but varying pixel widths in accordance with one or more embodiments.

Referring now to FIG. 5, a diagram of waveform selection with an energy duty cycle selector illustrating dynamically aligned pulses having a constant energy pulse widths but varying pixel widths in accordance with one or more embodiments will be discussed. Graph 510 of FIG. 5 is substantially similar to graph 410 of FIG. 4 with the following exceptions. Graph 510 shows desired pixel optical energy ($E_i$) versus pulse width ($W_i$). For a constant pixel energy along horizontal line 512, the width of the virtual pixels 222 may change. In region 416, for a constant pixel energy along line 512 the beam pulses 224 increase in width and the beam pulses 224 decrease in amplitude. In region 418, for a constant energy along line 512, the width of the virtual pixels 220 may be variable in width but the widths and heights of the beam pulses 224 remain constant. Thus, energy duty cycle selector 214 may select a waveform for the beam pulses 224 from region 418 based on the width of a given virtual pixel 222.

Figure 6:
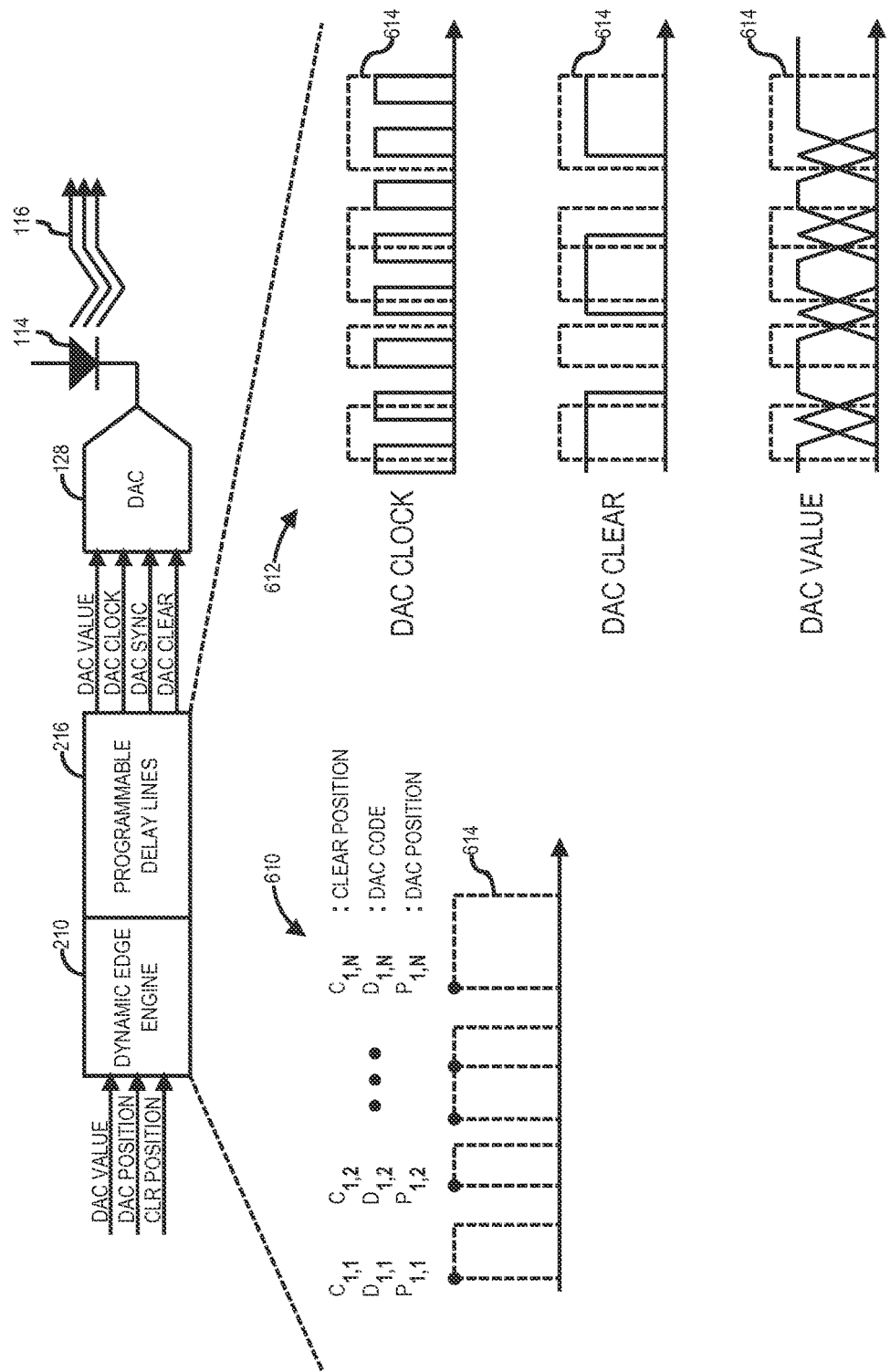
FIG. 6 is a diagram of a dynamic edge engine and programmable delay lines time updates to a digital-to-analog converter (DAC) to place a beam pulse waveform in a selected region of a virtual pixel in accordance with one or more embodiments.

Referring now to FIG. 6, a diagram of a dynamic edge engine and programmable delay lines time updates to a digital-to-analog converter (DAC) to place a beam pulse waveform in a selected region of a virtual pixel in accordance with one or more embodiments will be discussed. As shown in FIG. 6, dynamic edge engine 210 controls programmable delay lines 216 and the values provided to DAC 128 to control the alignment of the beam pulses 224 emitted from laser diode 114 as beam 116 within the corresponding virtual pixels 222, for example at the centers of the virtual pixels 222 rather than at or near the edges of the virtual pixels 222. Alignment, or realignment, of the samples provided to DAC 128 may be performed by dynamic edge engine 210 by dynamically reconfiguring the programmable delay lines 216 on a clock by clock basis. The programmable delay lines 216 precisely time the updates to DAC 128 to place and form a commanded beam pulse 224 at or near a center of its virtual pixel 222. Such alignment of the beam pulses 2224 by dynamic edge engine 210 may provide an increase in the sharpness of image 118, for example by avoiding the use of DAC sample interpolation which may soften the appearance of image 118. Furthermore, alignment of the beam pulses 224 by dynamic edge engine 210 may avoid image artifacts that may arise if the beam pulses 224 otherwise were not aligned with the virtual pixels 222.

Once a widths of the beam pulses 224 are known, the values for the beam pulses 224 may be packetized by dynamic edge engine 210. The input 610 waveforms provided to dynamic edge engine 210 comprise a packetized DAC waveform 614 for DAC code values, DAC position values, and clear position values. The output 612 waveforms provided to DAC 128 comprise DAC clock, DAC clear, and DAC code values received from the programmable delay lines 216 to align the beam pulses 224 with the virtual pixels 222. By packetizing the DAC waveform 614 in the pulse domain rather than the continuous domain, a maximum or nearly maximum efficiency and brightness may be achieved. In some embodiments, if the image 118 is zoomed out then some of the pixels of the image 118 may be too small. In this case, the width of a virtual pixel 222 may be less than a minimum threshold for a waveform of a beam pulse 224 to be applied. As a result, dynamic edge engine 210 may wait for image data for a next address, and the two virtual pixels 222 may be combined with a waveform of a single beam pulse 224, although the scope of the claimed subject matter is not limited in these respects.

Figure 7:
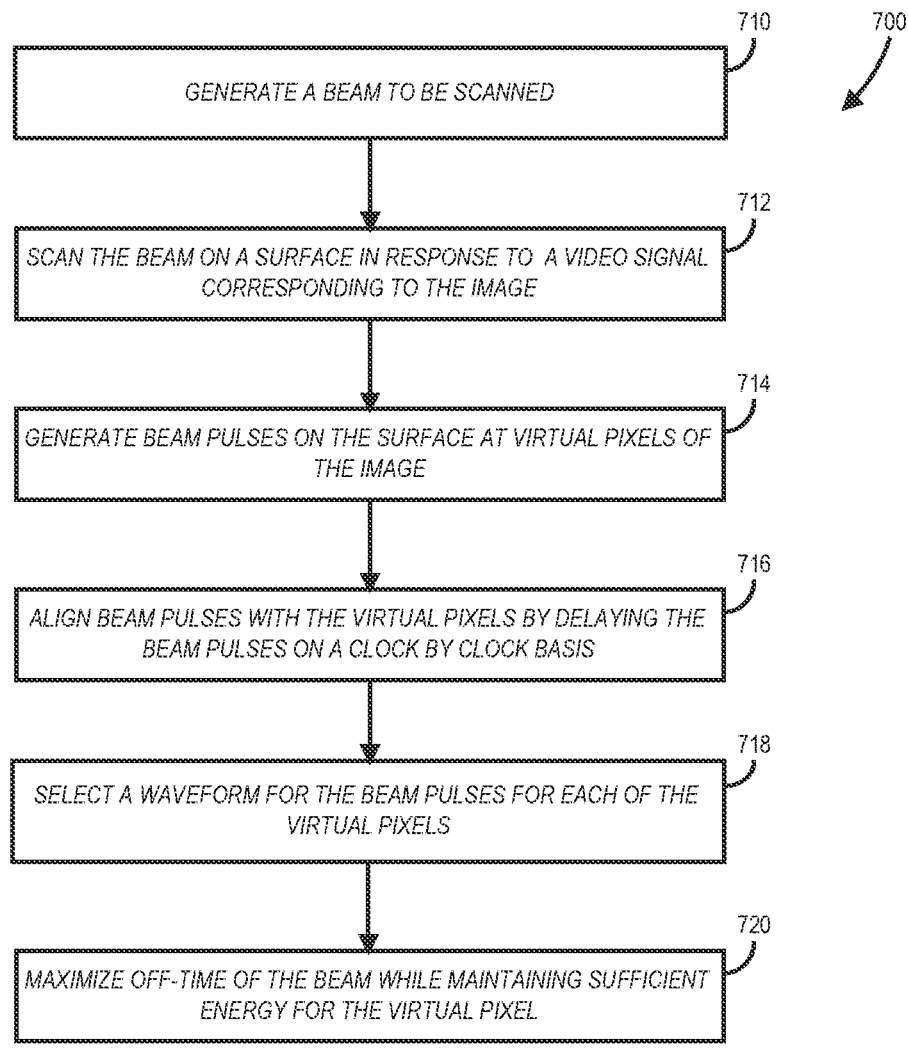
FIG. 7 is a flow diagram of a method to project an image on a surface in accordance with one or more embodiments.

Referring now to FIG. 7, a flow diagram of a method to project an image on a surface in accordance with one or more embodiments will be discussed. FIG. 7 illustrates one particular order and number of the operations of method 700, whereas in other embodiments method 700 may include more of fewer operations in various other orders, and the scope of the claimed subject matter is not limited in these respects. In some embodiments the operations of some blocks may occur concurrently or at least partially concurrently and the operations of some blocks may occur sequentially, although the scope of the claimed subject matter is not limited in these respects. At block 710, a beam 116 may be generated to be scanned on surface 120, and at block 712 the beam may be scanned on surface 120 in response to a video signal corresponding to an image to be projected on surface 120. Beam pulses 224 may be generated at block 714 on surface 120 at virtual pixels of the image 118. At block 716 the beam pulses 224 may be aligned with the virtual pixels 224 by delaying the beam pulses 224 on a clock by clock basis. At block 718 a waveform may be selected for the beam pulses 224 for each of the corresponding virtual pixels 222. At block 720, the off-time of the laser beam 116 may be maximized while maintaining sufficient energy for the virtual pixel 222, for example to maximize energy efficiency while also maximizing brightness of the pixel. It should be noted that in some embodiments method 700 of FIG. 7 may be implemented as code or instructions stored in an article of manufacture comprising a non-transitory storage medium such as electronic memory wherein the code or instructions are capable of causing a processor, logic, or other circuitry to execute the method, in whole or in part, although the scope of the claimed subject matter is not limited in these respects. An example of such processors and memory devices comprising non-transitory storage media are shown in and described with respect to FIG. 8, below.

Figure 8:
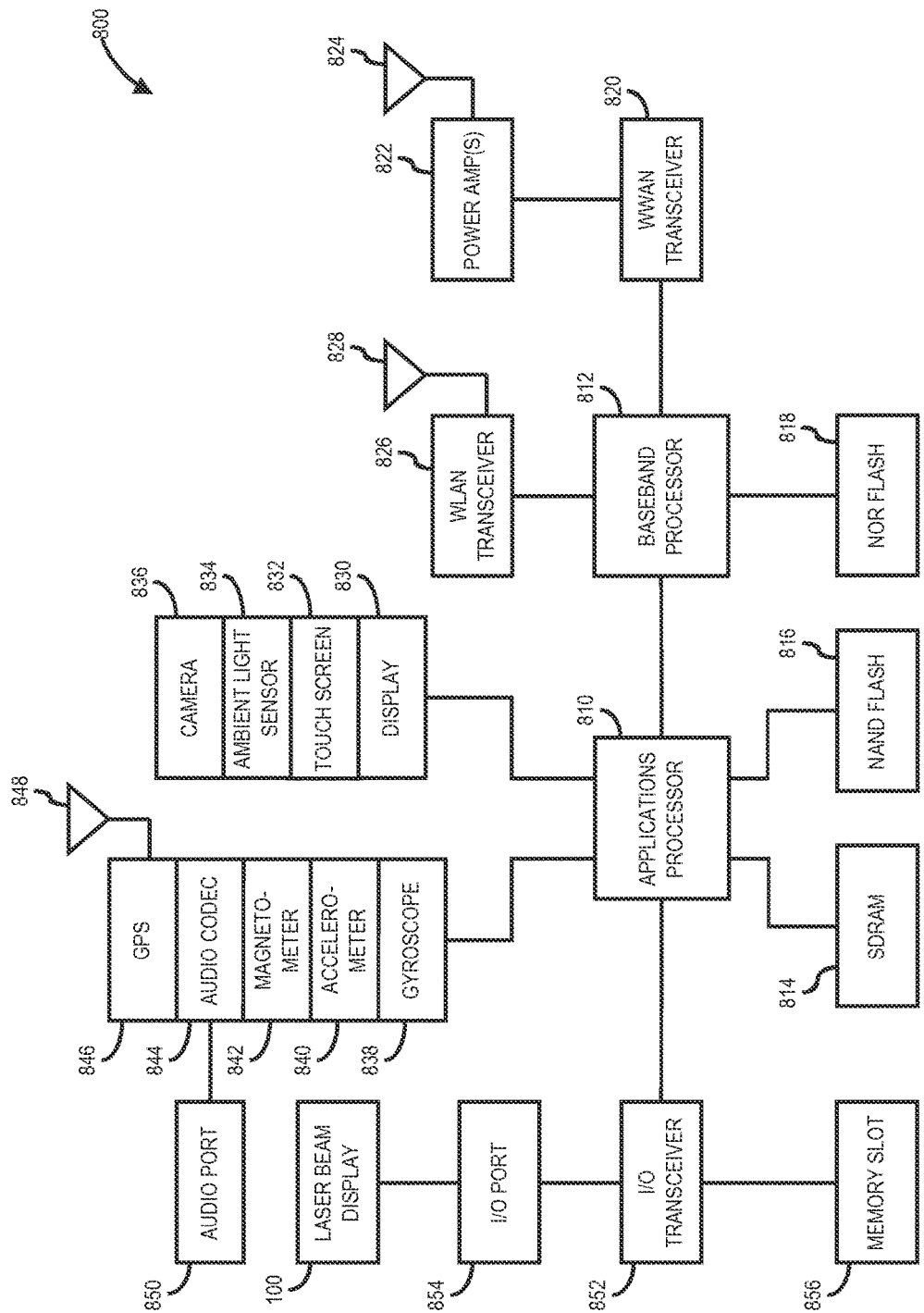
FIG. 8 is a block diagram of an information handling system to control pulsed pixels for a scanned beam projector in accordance with one or more embodiments.

Referring now to FIG. 8, a block diagram of an information handling system having a MEMS laser beam display utilizing pulsed laser control in accordance with one or more embodiments will be discussed. Although information handling system 800 represents one example of several types of computing platforms, such as a smartphone, tablet, hand held gaming device, personal computer or the like, information handling system 800 may include more or fewer elements and/or different arrangements of elements than shown in FIG. 8, and the scope of the claimed subject matter is not limited in these respects. Information handling system 800 may utilize the laser beam display 100 of FIG. 1, for example as a projection display to project an image on a display surface, and further to implement pulsed laser control, although the scope of the claimed subject matter is not limited in these respects.

In one or more embodiments, information handling system 800 may include an applications processor 810 and a baseband processor 812. Applications processor 810 may be utilized as a general purpose processor to run applications and the various subsystems for information handling system 800. Applications processor 810 may include a single core or alternatively may include multiple processing cores, for example wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off In one or more embodiments, instructions to operate or configure the information handling system 800 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a Third Generation (3G) or Fourth Generation (4G) network or the like or beyond, for example a Long Term Evolution (LTE) network. The WWAN transceiver 820 couples to one or more power amps 822 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848 for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects. In one or more embodiments, laser beam display 100 may be coupled to one or more of the I/O transceivers 852 and may be integrated within a housing of information handling system 800 or alternatively may be disposed exterior to the housing, although the scope of the claimed subject matter is not limited in these respects.

Referring now to FIG. 9, an isometric view of an information handling system that includes a laser beam display 100 utilizing pulsed laser control in accordance with one or more embodiments will be discussed. The information handling system 900 of FIG. 9 may represent a tangible embodiment of the information handling system 800 of FIG. 8. Information handling system 900 may comprise any of several types of computing platforms, including cell phones, personal digital assistants (PDAs), netbooks, notebook computers, internet browsing devices, tablets, pads, and so on, and the scope of the claimed subject matter is not limited in these respects. In the example shown in FIG. 9, information handling system 900 may comprise a housing 910 to house laser beam display 100 as discussed herein, for example to provide a scanned output beam 920 to project an image and/or to pulsed laser control as discussed herein. Information handling system 900 optionally may include a display 912 which may be a touch screen display, keyboard 914 or other control buttons or actuators, a speaker or headphone jack 916 with optional microphone input, control buttons 918, memory card slot 920, and/or input/output (I/O) port 922, or combinations thereof. Furthermore, information handling system 900 may have other form factors and fewer or greater features than shown, and the scope of the claimed subject matter is not limited in these respects.

Referring now to FIG. 10, a diagram of a vehicle that includes a laser beam display utilizing pulsed laser control deployed as a head-up display (HUD) in accordance with one or more embodiments will be discussed. In the embodiment shown in FIG. 10, the laser beam display 100 may be deployed in a vehicle 1010 such as in the dashboard of the automobile 1010, and which may project an image 1020 that may be viewable by an operator or passenger of the vehicle. Although FIG. 10 shows one example deployment of a laser beam display 100 utilizing pulsed laser control as a display projector, other types of deployments likewise may be provided, and the scope of the claimed subject matter is not limited in this respect.

Referring now to FIG. 11, a diagram of eyewear that includes a laser beam display utilizing pulsed laser control as a head-mounted display (HMD) in accordance with one or more embodiments will be discussed. In the embodiment shown in FIG. 11, the laser beam display beam scanner 100 may be deployed in eyewear 1110 or other head worn device, for example attached to a frame of the eyewear 1110, and which may project an image 1120 that may be viewable by the wearer of the eyewear 1110. Although FIG. 11 shows one example deployment of a laser beam display 100 utilizing mixed-mode depth detection as a display projector, other types of deployments likewise may be provided, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to scanned beam projector pulsed laser control and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A scanned beam projector, comprising:
   a laser diode to emit a beam;
   a scanning engine to scan the beam on a surface to project an image comprising virtual pixels on the surface;
   a digital-to-analog converter (DAC) coupled to the laser diode to cause the laser diode to emit the beam in response to a digital video signal provided to the DAC; and
   a pulsed pixel controller to provide the digital video signal to the DAC, the pulsed pixel controller to align the digital video signal provided to the DAC with the virtual pixels of the image, and to select an optimal waveform to be generated by the laser diode for the virtual pixels, wherein the pulsed pixel controller comprises a dynamic edge engine to configure a set of programmable delay lines on a clock by clock basis to time updates for the DAC to form a pixel for a corresponding virtual pixel.

2. A scanned beam projector, comprising:
a laser diode to emit a beam;
a scanning engine to scan the beam on a surface to project an image comprising virtual pixels on the surface;
a digital-to-analog converter (DAC) coupled to the laser diode to cause the laser diode to emit the beam in response to a digital video signal provided to the DAC; and
a pulsed pixel controller to provide the digital video signal to the DAC, the pulsed pixel controller to align the digital video signal provided to the DAC with the virtual pixels of the image, and to select an optimal waveform to be generated by the laser diode for the virtual pixels, wherein the pulsed pixel controller comprises an energy duty cycle selector to provide a maximally, or nearly maximally, efficient waveform for a corresponding virtual pixel.

3. The scanned beam projector as claimed in claim 2, wherein the waveform is selected based at least in part on a desired optical energy and a time period of the virtual pixel.

4. The scanned beam projector as claimed in claim 2, wherein the waveform is selected to maximize, or nearly maximize, off-time of the laser diode while maintaining sufficient pixel energy.

5. The scanned beam projector as claimed in claim 1, further comprising a position estimator to estimate a position of the scanning engine and to provide a positon of the scanning engine to the pulsed pixel control to facilitate alignment of the digital video signal provided to the DAC with the virtual pixels.

6. An information handling system, comprising:
a processor and a memory coupled to the processor; and
a scanned beam processor coupled to the processor to project an image stored in the memory, wherein the scanned beam processor comprises:
a laser diode to emit a beam;
a scanning engine to scan the beam on a surface to project the image on the surface, wherein the image comprises virtual pixels;
a digital-to-analog converter (DAC) coupled to the laser diode to cause the laser diode to emit the beam in response to a digital video signal corresponding to the image and provided to the DAC; and
a pulsed pixel controller to provide the digital video signal to the DAC, the pulsed pixel controller to align the digital video signal provided to the DAC with the virtual pixels of the image, and to select an optimal waveform to be generated by the laser diode for the virtual pixels, wherein the pulsed pixel controller comprises a dynamic edge engine to configure a set of programmable delay lines on a clock by clock basis to time updates for the DAC to form a pixel for a corresponding virtual pixel.

7. An information handling system, comprising:
a processor and a memory coupled to the processor; and
a scanned beam processor coupled to the processor to project an image stored in the memory, wherein the scanned beam processor comprises:
a laser diode to emit a beam;
a scanning engine to scan the beam on a surface to project the image on the surface, wherein the image comprises virtual pixels;
a digital-to-analog converter (DAC) coupled to the laser diode to cause the laser diode to emit the beam in response to a digital video signal corresponding to the image and provided to the DAC; and
a pulsed pixel controller to provide the digital video signal to the DAC, the pulsed pixel controller to align the digital video signal provided to the DAC with the virtual pixels of the image, and to select an optimal waveform to be generated by the laser diode for the virtual pixels, wherein the pulsed pixel controller comprises an energy duty cycle selector to provide a maximally, or nearly maximally, efficient waveform for a corresponding virtual pixel.

8. The information handling system as claimed in claim 7, wherein the waveform is selected based at least in part on a desired optical energy and a time period of the virtual pixel.

9. The information handling system as claimed in claim 7, wherein the waveform is selected to maximize, or nearly maximize, off-time of the laser diode while maintaining sufficient pixel energy.

10. The information handling system as claimed in claim 6, further comprising a position estimator to estimate a position of the scanning engine and to provide a positon of the scanning engine to the pulsed pixel control to facilitate alignment of the digital video signal provided to the DAC with the virtual pixels.

11. The information handling system as claimed in claim 6, wherein the pulsed pixel controller comprises an energy duty cycle selector to provide a maximally, or nearly maximally, efficient waveform for a corresponding virtual pixel.

12. The information handling system as claimed in claim 11, wherein the waveform is selected based at least in part on a desired optical energy and a time period of the virtual pixel.

13. The information handling system as claimed in claim 11, wherein the waveform is selected to maximize, or nearly maximize, off-time of the laser diode while maintaining sufficient pixel energy.

14. The information handling system as claimed in claim 7, further comprising a position estimator to estimate a position of the scanning engine and to provide a positon of the scanning engine to the pulsed pixel control to facilitate alignment of the digital video signal provided to the DAC with the virtual pixels.

15. The scanned beam projector as claimed in claim 1, wherein the pulsed pixel controller comprises an energy duty cycle selector to provide a maximally, or nearly maximally, efficient waveform for a corresponding virtual pixel.

16. The scanned beam projector as claimed in claim 15, wherein the waveform is selected based at least in part on a desired optical energy and a time period of the virtual pixel.

17. The scanned beam projector as claimed in claim 15, wherein the waveform is selected to maximize, or nearly maximize, off-time of the laser diode while maintaining sufficient pixel energy.

18. The scanned beam projector as claimed in claim 2, further comprising a position estimator to estimate a position of the scanning engine and to provide a positon of the scanning engine to the pulsed pixel control to facilitate alignment of the digital video signal provided to the DAC with the virtual pixels.

* * * * *